United States Patent
Worley

[15] 3,682,509
[45] Aug. 8, 1972

[54] TRUSS FOR A BICYCLE SADDLE AND METHOD OF MAKING SAME
[72] Inventor: George W. Worley, Bolivar, Tenn.
[73] Assignee: Troxel Manufacturing Company, Moscow, Tenn.
[22] Filed: Dec. 29, 1969
[21] Appl. No.: 888,404

[52] U.S. Cl. ................. 297/195, 29/150, 248/205, 287/20.3
[51] Int. Cl. ...... B62j 1/04, F16m 11/00, F16m 11/06
[58] Field of Search ....... 248/205, 221; 287/20.3, 20, 287/23; 29/150, 155; 297/195, 203

[56] References Cited

UNITED STATES PATENTS

| 2,663,270 | 12/1953 | Friedly | 29/150 U |
| 3,402,961 | 9/1968 | Larson | 287/20 X |
| 2,931,423 | 4/1960 | Kalter | 287/20.3 |
| 3,228,089 | 1/1966 | Turner | 29/150 X |
| 3,430,905 | 3/1969 | Pepe | 248/300 X |

Primary Examiner—J. Franklin Foss
Attorney—John R. Walker, III

[57] ABSTRACT

A truss assembly for use to support a bicycle seat. The truss assembly includes a post, a bracket, an upper washer and a lower washer. The upper portion of the post extends through apertures in the washers and an elongated slot in the bracket, and the upper portion is provided with an enlarged head on the upper end thereof to hold said washers, said bracket and said post in a tight immovable relationship. The method of forming the truss includes cold working the upper portion of the post by applying a force thereto to spread the metal thereof laterally tightly against the lateral walls of the portions of said bracket defining said slot and to form an enlarged cold head on the upper end of said upper portion to tightly clamp and form an immovable assembly of said washers, said bracket and said post.

5 Claims, 9 Drawing Figures

PATENTED AUG 8 1972

3,682,509

INVENTOR.
GEORGE W. WORLEY
BY John R. Walker, III
Attorney

TRUSS FOR A BICYCLE SADDLE AND METHOD OF MAKING SAME

BACKGROUND OF THE INVENTION

1. Field of the Invention

This invention relates to truss assemblies or supports for bicycle seats.

2. Description of the Prior Art

The typical support means for an elongated bicycle seat of the well known type which the assignee of the present invention and others presently manufacture and which assignee refers to its seat by the trademark "Banana Seat," is generally an inverted U-shaped continuous bar which supports and extends over the rear section of the seat, and a post which supports the forward end of the seat. With the support being at two places, the seat is very securely supported. However, with the smaller version of the elongated seat for juvenile use in which the entire seat is supported by a single post, there have heretofore been problems. These problems are caused by the fact that the seats are elongated and consequently have a long lever arm which exerts a large force at the connection between the seat and the post during the use of the seat. As for example, when going over bumpy terrain, a child may come down on the rearward end of the seat, exerting a force with a long lever arm which greatly multiplies the force at the connection with the single post. Some of the problems encountered were as follows: The connection between the post and the seat became loose or broke off entirely. In the previous practice of staking the upper end with a star punch, many times the portions of metal which were spread apart by the star punch would break off, allowing the seat bracket or truss to become detached from the post. In addition, many times the brackets which were made of flat straplike metal would bend after a period of use. It should be pointed out that one of the difficulties in providing a single truss assembly for a juvenile seat is the fact that the truss assembly must be adaptable for adjustment to a given angle before the final operation is completed. This adjustment is necessary in manufacturing truss assemblies for various manufacturers since they require different angles of the seat relative to the post.

SUMMARY OF THE INVENTION

This invention is directed towards overcoming the heretoforementioned and other problems relative to truss assemblies for bicycle seats, particularly those which utilize a single support as with juvenile elongated seats. It is a concept of the present invention to overcome these problems by providing a structurally strong assembly of a post, a bracket, an upper washer and a lower washer which are tightly clamped by means of a cold head at the upper end of the post so that the assembly is in a tight immovable relationship. In forming the cold head, the metal of the post is expanded outwardly tightly against portions of the bracket which define the walls of the slot through which the post extends so that it is held firmly in the slot once the selected angularity is established. It is a further concept of the present invention to provide upstanding ribs respectively on the lateral edges of the bracket, and to provide a pair of ribs integral with the lower washer and downwardly protruding from the lower surface thereof so that any bending of the truss assembly in sue is eliminated.

The method of forming the truss of the present invention includes the following steps:

1. Placing the upper and lower washers respectively above and below the intermediate portion of the bracket with the apertures in the washers being aligned with one another and with the slot in the intermediate portion;

2. Extending the reduced upper portion of the post through the apertures and the slot;

3. Adjusting the angle of the post with the bracket at a selected angle; and

4. Cold working the reduced upper portion by applying pressure thereto to spread the metal laterally tightly against the lateral walls of the intermediate portion defining the slot and to form an enlarged cold head on the upper end of the upper portion to tightly clamp and form an immovable assembly of the washers, the bracket and the post.

Additionally, it is a further concept of the method to include the additional steps of forming upturned ribs on the lateral edges of the intermediate portion of the bracket and providing at least a pair of ribs projecting downwardly from the lower surface of the lower washer.

DESCRIPTION OF THE PREFERRED EMBODIMENTS

Figure 1:
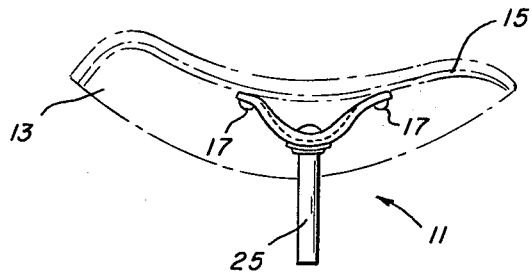
FIG. 1 is a side elevational view of the truss assembly of the present invention illustrated in connection with an elongated bicycle seat (the bicycle seat being shown in broken lines).

The truss assembly 11 of the present invention is shown in FIG. 1 supporting a typical elongated juvenile bicycle seat 13. As will be noted, the truss assembly 11 is attached to the lower surface of the base 15 of seat 13 by suitable means as the rivets 17.

Before assembly of truss 11, the truss includes four separate parts which are preferably formed from metal, such as steel, as follows: An upper washer 19, a truss bracket 21, a lower washer 23, and a post 25.

Figure 6:
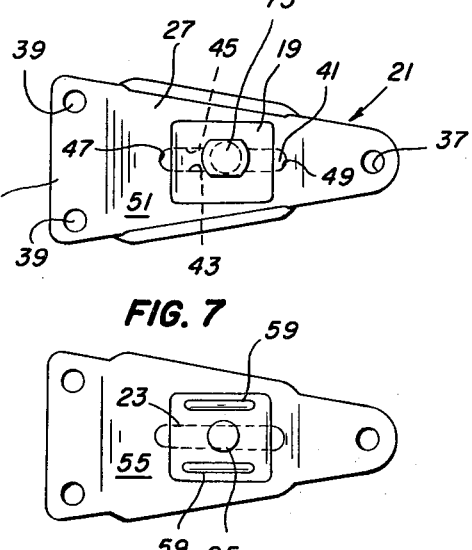
FIG. 6 is a top plan view of the truss after assembly.
Figure 7:
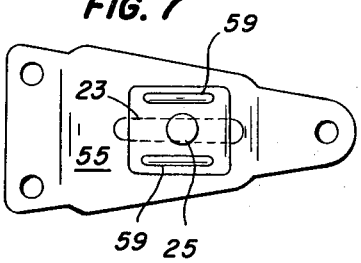
FIG. 7 is a bottom view of same.

Bracket 21 is preferably stamped and formed from a flat single piece of metal, and when formed, includes an intermediate arcuate portion 27 having a pair of upstanding ribs 29, 31 formed along the opposite side edges of the intermediate portion. In addition, bracket 21 includes a relatively narrow and flat forward end 33 integrally formed at the forward edge of intermediate portion 27 and a relatively wider rearward end 35 integrally formed along the rearward edge of intermediate portion 27. As viewed from the side, as in FIG. 2, the forward and rearward ends 33, 35 are at an angle relative to each other to conform to the lower surface of the base 15 of bicycle seat 13. As viewed in plan, as in FIG. 6, bracket 21 is substantially triangular-shaped. An aperture 37 is provided vertically through forward end 33 and a pair of apertures 39 are provided vertically through rearward end 35 whereby the rivets 17 can extend therethrough for the attachment of truss assembly 11 to the bicycle seat 13. An elongated slot 41 is provided vertically through intermediate portion 27. Slot 41 extends longitudinally, i.e., fore and aft, along the longitudinal centerline of bracket 21, and is defined by the parallel spaced apart lateral walls 43, 45 and opposite arcuate end walls 47, 49.

Figure 2:
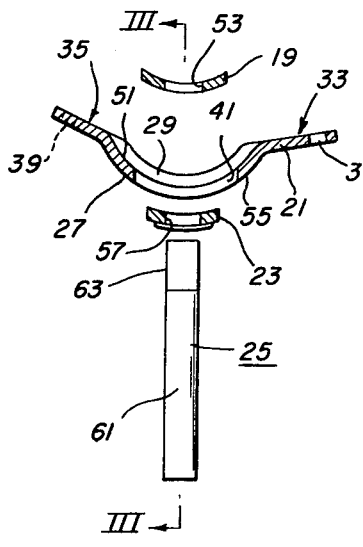
FIG. 2 is an exploded view of the parts of the assembly before being assembled and with the washers and brackets being shown in section.

Upper washer 19 is preferably rectangular, as viewed from above, and is arcuate in longitudinal section, as viewed in FIG. 2, to fit the arcuate upper surface 51 of intermediate portion 27. Upper washer 19 is provided with a central aperture 53 which preferably has a length slightly greater than the diameter of post 25 and a width equal to the width of slot 41.

Lower washer 23 is formed similar to upper washer 19 so that it fits the lower surface 55 of intermediate portion 27 and is provided with an aperture 57 like aperture 53. In addition, lower washer 23 is provided with a pair of spaced apart longitudinally extending embossed ribs 59 integral with the lower washer on either side of aperture 57 and downwardly protruding from the lower surface of the washer.

Figure 3:
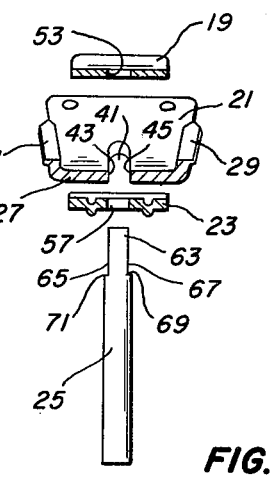
FIG. 3 is a sectional view taken as on the line III—III of FIG. 2.
Figure 4:
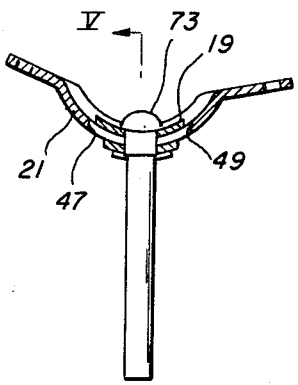
FIG. 4 is a side view of the truss after assembly with the post being shown in elevation and the bracket and washers being shown in section.
Figure 5:
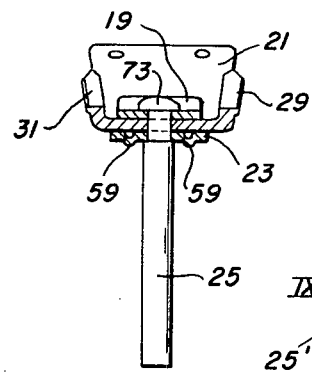
FIG. 5 is a sectional view taken as on the line V—V of FIG. 4.
Figure 8:
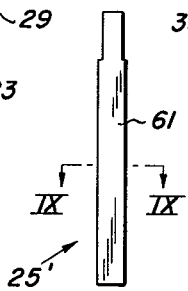
FIG. 8 is a side elevational view of an optional form of the post.
Figure 9:
FIG. 9 is a sectional view taken as on the line IX—IX of FIG. 8.

Post 25 includes an enlarged lower portion 61 which is preferably cylindrical and which is adapted to be mounted on a bicycle, not shown. Lower portion 61 may be shaped other than cylindrical, if desired, as for example, like the square lower portion 61' of the post 25' shown in FIGS. 8 and 9. The upper portion 63 of post 25, before assembly, is configured as best seen in FIGS. 2 and 3, wherein it will be seen it is a reduced portion as compared with the lower portion 61. This reduced upper portion is preferably formed by cutting away the metal on opposite sides of the post by an equal amount to provide parallel surfaces 65, 67 spaced apart a distance slightly less than a distance between sidewalls 43, 45 of slot 41 and the width of the apertures 53, 57. Also, shoulders 69, 71 are provided on opposite sides of the post 25 adjacent the juncture of portion 63 with lower portion 61 and which shoulders are perpendicular to the surfaces 65, 67.

After the parts have been formed as heretofore described, the remaining steps in the method of the present invention to form the assembled truss 11, are as follows: Upper washer 19 and lower washer 23 are placed respectively above and below intermediate portion 27 with the apertures 53, 57 therein being aligned with each other and with slot 41. Next, the reduced upper portion 63 of post 25 is extended upwardly through aperture 57, slot 41, and aperture 53 until shoulders 69, 71 engage the lower surface of washer 23. Then, post 25 is moved relative to bracket 21 to move the upper portion 63 in slot 41 until the desired angularity is established between the post and bracket ultimately to place the seat with which the truss 11 is to be used at the proper angle. After the angle is adjusted, as heretofore described, the upper portion 63 is cold worked by applying pressure thereto, as for example, in a punch machine utilizing a die to form an enlarged button-like cold head 73 on the upper end of upper portion 63. In the above-mentioned cold working, the metal of upper portion 63, which is below cold head 73, is spread laterally tightly against the lateral walls 43, 45 and against the walls defining the apertures 53, 57 in washers 19, 23. In addition, it will be understood that the cold head 73 is held tight against the upper surface of washer 19 so that the washers 19, 23 and bracket 21 are clamped tightly between the cold head 73 and the shoulders 69, 71. The result is the formation of an immovable assembly 11 of the parts including washers 19, 23, bracket 21 and post 25 so that there can be no twisting or other relative movements and the bracket 21 is held firmly in place relative to post 25.

Although the invention has been described and illustrated with respect to a preferred embodiment thereof, it is to be understood that it is not to be so limited since changes and modifications may be made therein which are within the full intended scope of this invention.

I claim:

1. In combination, a bicycle saddle having a frame, a truss comprising a bracket separate from said frame, said bracket having a forward end, a rearward end, an arcuate intermediate portion integrally interconnecting said forward and rearward ends, means fixedly attaching said bracket to said frame, an elongated slot extending through said intermediate portion, an upper arcuate washer having an aperture therethrough, a lower arcuate washer having an aperture therethrough, said upper and lower washers being disposed respectively on the upper and lower sides of said intermediate portion with the apertures of said upper and lower washers being aligned with one another and with said slot, a single post having an enlarged lower portion and a reduced upper portion extending through said apertures and said slot and being in tight expanded engagement with the portions of said intermediate portion defining the side walls of said slot, and a cold head being integrally provided on the upper end of said reduced upper portion of said post above said upper washer to unreleasably hold said washers, said bracket and said post in a tight immovable relationship, said truss being the entire support for said bicycle saddle.

2. The truss of claim 1 in which said intermediate portion is provided with a pair of upstanding ribs respectively integrally provided on the lateral edges thereof to define the outermost portions of said intermediate portion.

3. The truss of claim 2 in which said lower washer is provided with at least a pair of ribs integral with said lower washer and downwardly protruding from the lower surface thereof.

4. A method for forming a truss for the entire support of a bicycle saddle from a bracket having a forward end, a rearward end and an arcuate intermediate portion integrally interconnecting said forward and rearward ends, said intermediate portion having an elongated slot therethrough, from a pair of arcuate washers each having an aperture therethrough, and from a metal post having an enlarged lower portion and a reduced upper portion slightly smaller in width than the width of said slot; said method comprising the steps of placing said upper and lower washers respectively above and below said intermediate portion with the apertures in said washers being aligned with one another and with said slot, extending the reduced upper portion of said post through said apertures and said slot, adjusting the angle of said post with said bracket at a selected angle, and cold working said reduced upper portion by applying pressure thereto to spread the metal laterally tightly against the lateral walls of said intermediate portion defining said slot and to form an enlarged cold head on the upper end of said upper portion to tightly clamp and form an immovable assembly of said washers, said bracket and said post.

5. The method of claim 4 which includes the additional steps of forming upturned ribs on the lateral edges of said intermediate portion and providing at least a pair of ribs projecting downwardly from the lower surface of said lower washer.

* * * * *